(12) United States Patent
Primorac

(10) Patent No.: US 11,002,319 B2
(45) Date of Patent: May 11, 2021

(54) FRICTION LAMELLA

(71) Applicant: Miba Frictec GmbH, Laakirchen (AT)

(72) Inventor: Mladen-Mateo Primorac, St. Poelten (AT)

(73) Assignee: Miba Frictec GmbH, Laakirchen (AT)

(*) Notice: Subject to any disclaimer, the term of this patent is extended or adjusted under 35 U.S.C. 154(b) by 99 days.

(21) Appl. No.: 16/333,355

(22) PCT Filed: Sep. 27, 2017

(86) PCT No.: PCT/AT2017/060241
§ 371 (c)(1),
(2) Date: Mar. 14, 2019

(87) PCT Pub. No.: WO2018/058164
PCT Pub. Date: Apr. 5, 2018

(65) Prior Publication Data
US 2019/0211887 A1    Jul. 11, 2019

(30) Foreign Application Priority Data
Sep. 27, 2016  (AT) .............. A 50861/2016

(51) Int. Cl.
*F16D 13/64* (2006.01)
*F16D 13/68* (2006.01)
*F16D 13/72* (2006.01)
*F16D 13/74* (2006.01)

(52) U.S. Cl.
CPC .......... *F16D 13/644* (2013.01); *F16D 13/64* (2013.01); *F16D 13/686* (2013.01); *F16D 13/72* (2013.01); *F16D 13/74* (2013.01)

(58) Field of Classification Search
CPC ....... F16D 13/644; F16D 13/64; F16D 13/686
See application file for complete search history.

(56) References Cited

U.S. PATENT DOCUMENTS

| | | | |
|---|---|---|---|
| 1,888,779 A | 11/1932 | Tower | |
| 1,934,109 A * | 11/1933 | Wemp | F16D 13/648 192/107 C |
| 3,961,692 A * | 6/1976 | Marquis | F16D 27/06 192/84.951 |
| 4,967,893 A | 11/1990 | Vogele | |
| 5,546,880 A | 8/1996 | Ronyak et al. | |
| 5,566,803 A * | 10/1996 | Lindner | F16D 13/64 192/107 C |

(Continued)

FOREIGN PATENT DOCUMENTS

| CN | 1130730 A | 9/1996 |
|---|---|---|
| DE | 16 25 715 A1 | 7/1970 |

(Continued)

OTHER PUBLICATIONS

Letter from the Austrian Patent Attorney to the European Patent Office in PCT/AT2017/060241, dated May 23, 2018, with English translation of relevant parts (Continued)

*Primary Examiner* — Tinh Dang
(74) *Attorney, Agent, or Firm* — Collard & Roe, P.C.

(57) ABSTRACT

The invention relates to a friction plate (10) having a basic body (5 or 9), which is formed from at least one strip (11), deviating from the circular-ring shape.

5 Claims, 2 Drawing Sheets

(56) References Cited

Figure 1:
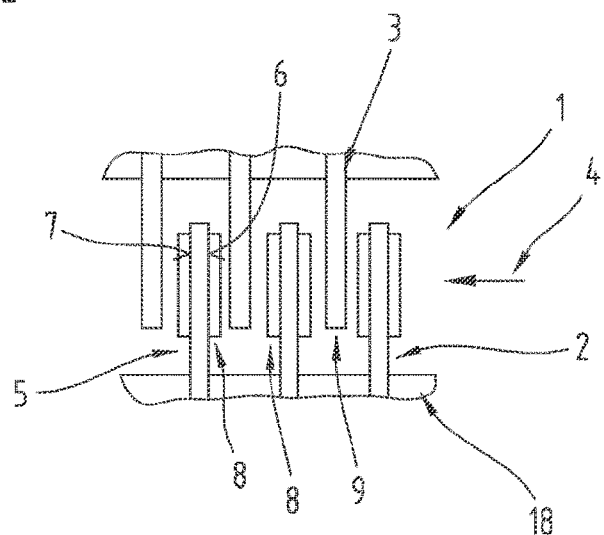

U.S. PATENT DOCUMENTS 6,899,783 B2    5/2005  Oguri et al.

FOREIGN PATENT DOCUMENTS

| | | |
|---|---:|---:|
| DE | 2 159 194 A1 | 6/1973 |
| DE | 41 09 606 A1 | 9/1992 |
| DE | 44 16 949 C1 | 9/1995 |
| DE | 695 16 105 T2 | 12/2000 |
| DE | 103 59 301 A1 | 7/2004 |
| DE | 10 2009 032 180 A1 | 1/2011 |
| EP | 0 372 118 B1 | 11/1993 |
| GB | 2 63 767 A | 8/1927 |
| GB | 2 292 436 A | 2/1996 |

OTHER PUBLICATIONS

International Search Report in PCT/AT2017/060241, dated Feb. 5, 2018.

* cited by examiner

FRICTION LAMELLA

CROSS REFERENCE TO RELATED APPLICATIONS

This application is the National Stage of PCT/AT2017/060241 filed on Sep. 27, 2017, which claims priority under 35 U.S.C. § 119 of Austrian Application No. A 50861/2016 filed on Sep. 27, 2016, the disclosure of which is incorporated by reference. The international application under PCT article 21(2) was not published in English.

The invention relates to a friction plate having a basic body. Furthermore, the invention relates to a friction module comprising multiple friction plates, which are disposed on a carrier, one behind the other in the axial direction.

By its nature, a relatively large amount of waste occurs in the production of circular-ring-shaped friction plates, which waste can be recycled only with difficulty or with greater effort. In order to take this problem into account, the most varied solutions have already been described in the prior art. For example, the friction plates are produced from individual segments, which are joined together to form the finished circular ring of the friction plate, as is described in DE 2 159 194 C.

A method for the production of a friction plate is known from DE 10 2009 032 180 A1, according to which method an elongated sheet-metal strip having teeth that project laterally on at least one longitudinal edge is produced. After application of at least one pre-finished friction coating body or of a scatter-sintered coating onto the sheet-metal strip to form a friction coating, the sheet-metal strip is shaped to form a ring.

The present invention is based on the task of creating a further possibility for reduction of waste in the production of friction plates or friction modules.

This task is accomplished, in the case of the friction plate mentioned initially, in that the basic body is formed from at least one strip, deviating from the circular-ring shape, having outer end regions and a center region that lies between them, and, in the case of the friction module mentioned initially, in that at least one friction plate is configured according to the invention.

It is advantageous, in this regard, that the friction plate basic body is produced from simple strips, and, in this regard, that the formation of the circular-ring geometry is eliminated. Therefore the waste that results from replicating the circular-ring geometry by means of cutting is eliminated in the production of the friction plate. As a result, production of the friction plate can be structured to be more efficient. By means of this embodiment of the friction plate, an improvement in oiling and thereby an improvement in heat dissipation can furthermore be achieved, since the friction plate has many large-volume interstices as the result of this design, which interstices can be better supplied with oil. It is thereby furthermore possible to produce the friction plate in simple manner, by increasing the number of strips having different layer thicknesses, so that it is possible to do without additional construction measures for reasons of strength, such as, for example, the formation of a bushing, as it is described in EP 0 372 118 B1, for example.

According to an embodiment variant of the friction plate, it can be provided that the friction plate basic body is formed from at least two strips, which are disposed to be rotated about a pre-definable angle value relative to one another. Depending on the number of strips, the circular-ring geometry can thereby be more or less replicated, and thereby the friction plate fits into a conventional friction module better.

Furthermore, however, it is thereby also possible to structure the strips with a low width, if necessary, and thereby the weight of the friction plate can be reduced. This in turn is advantageous when releasing the friction plate from friction engagement with a further friction plate of a friction module.

According to an embodiment variant of this, it can be provided that the outer end regions of at least one strip of the multiple strips are structured with a greater thickness than the center region of the same strip. In this way, the friction plate can be made available with an improved planarity of the overall plate, and thereby the friction engagement with a counter-plate can be improved.

The friction plate can be configured to be free of a friction coating as a counter-plate. Likewise, it is possible that in the outer end regions of the friction plate of the at least one strip, at least one friction coating is provided, in each instance. The friction plate can therefore be used universally.

If the friction plate is equipped with friction coatings, it can be provided that the friction coatings of at least two strips have a different layer thickness. In this way, the planarity of the friction plate during friction engagement can also be improved, as this was described above for the embodiment variant having the thicker end regions of at least one strip.

The end regions of at least individual strips can also be bent over or can be configured to be offset from the plane of the center region. In this way, a level contact surface of the end regions of all the strips on a counter-plate can likewise be achieved.

It is possible that the multiple strips are arranged loosely. This means that the individual strips of the friction plate are not connected with one another. By means of this embodiment variant, an improvement in the heat dissipation by means of oil can be achieved, since the oil can also penetrate between the strips. No further design configurations, such as oil grooves or the like, are absolutely necessary for this, although their formation in the strip is possible.

According to another embodiment variant, however, it can also be provided that the multiple strips are connected with one another, and thereby the stability of the friction plate can be improved.

For a better understanding of the invention, it will be explained in greater detail using the following figures.

Figure 2:
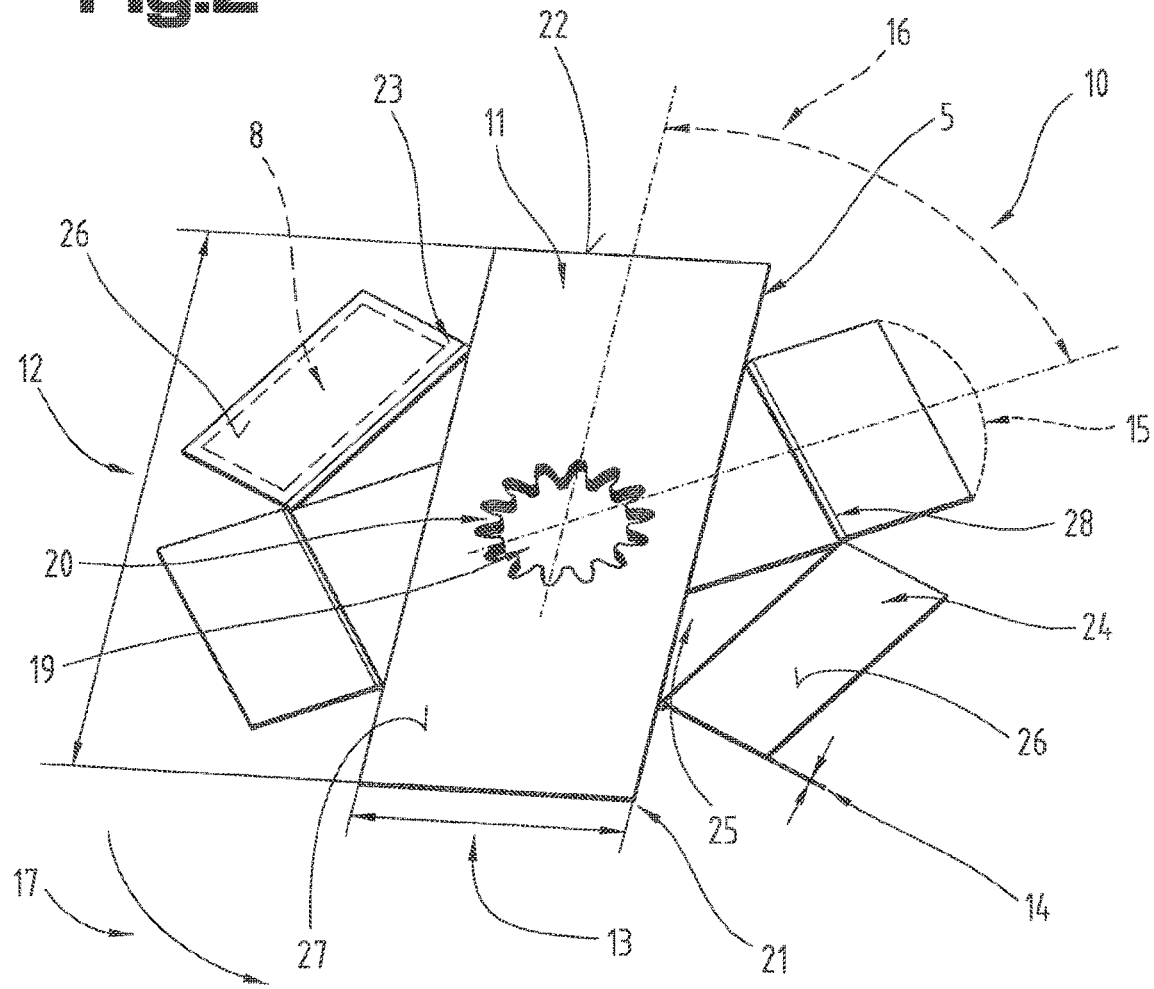
Figure 3:
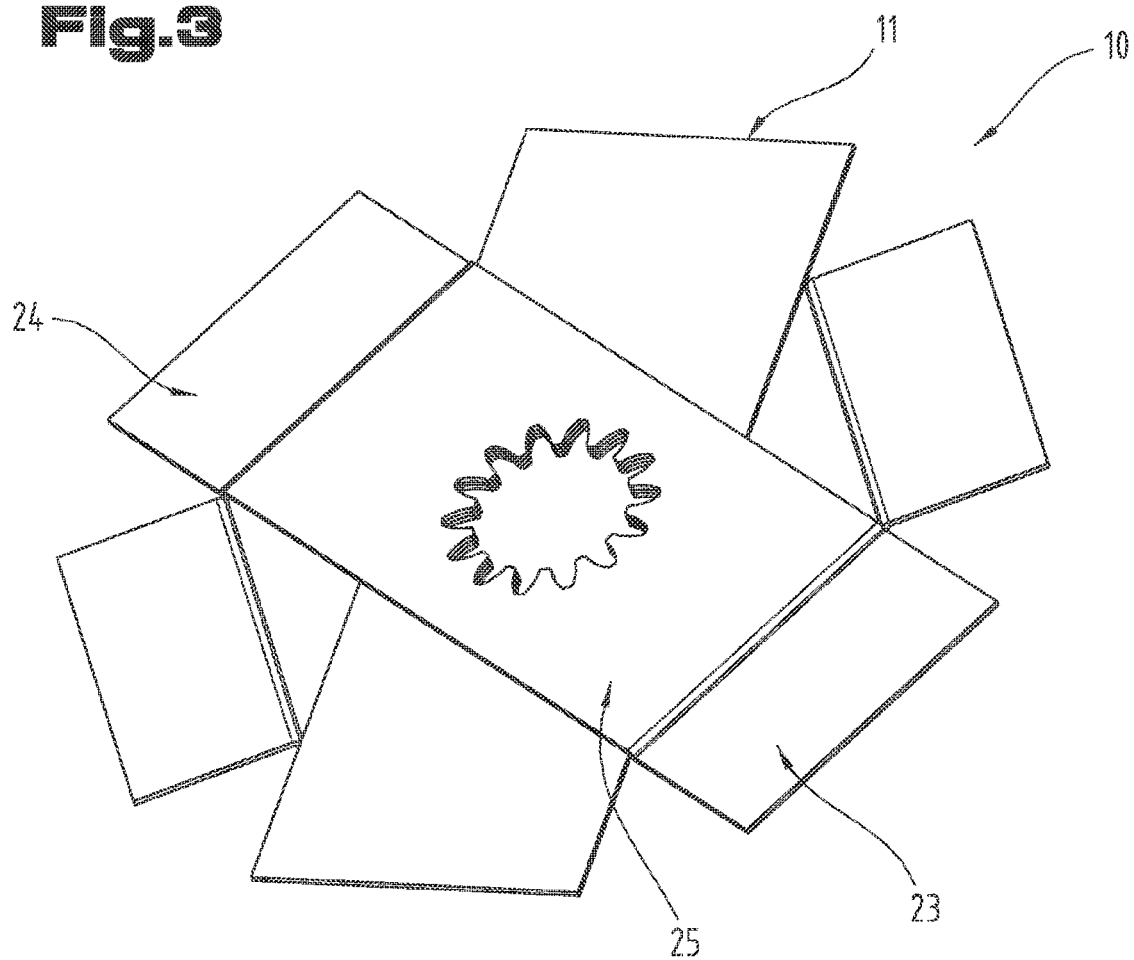
Figure 4:
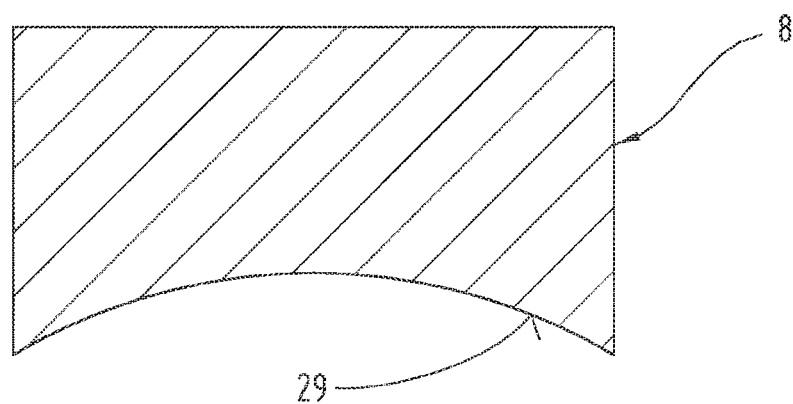

These show, each in a simplified, schematic representation:

FIG. 1 a detail of a plate package in a side view;

FIG. 2 an embodiment variant of a friction plate in a slanted view;

FIG. 3 another embodiment variant of the friction plate in a slanted view;

FIG. 4 a cross-section through a friction coating.

As an introduction, it should be stated that in the different embodiments described, the same parts are provided with the same reference symbols or the same component designations, wherein the disclosures contained in the description as a whole can be transferred analogously to the same parts having the same reference symbols or the same component designations. Also, the position information selected in the description, such as at the top, at the bottom, at the side, etc., for example, relates to the figure being directly described and shown, and must be transferred analogously to a new position in the event of a change in position.

In FIG. 1, a detail of a known plate package 1 is shown. The plate package 1 has multiple inner plates 2 and multiple outer plates 3, which can also be referred to as friction plates. The inner plates 2 are disposed to alternate with the outer plates 3 in an axial direction 4. The inner plates 2 are adjustable relative to the outer plates 3 in the axial direction 4, so that a friction lock is formed between the inner plates 2 and the outer plates 3.

The inner plates 2 have a basic body 5 having a first surface 6 and a second surface 7, which lies opposite the first in the axial direction 4. A friction coating 8 is disposed on the first and/or second surface 6, 7, in each instance. The inner plates 2 are therefore so-called coated plates. However, it is also possible that the inner plates 2 do not have any friction coatings 8.

The friction coatings 8 can be configured in accordance with the state of the art.

The outer plates 3 have a basic body 9, which is, however, free of friction coatings. The outer plates 3 are the so-called counter-plates, which can be brought into a friction lock with the friction coatings 8 of the inner plates 2. It is also possible that friction coatings 8 are disposed on the outer plates 3, in particular if the inner plates 2 are free of friction coatings 8.

This fundamental structure of a plate package 1 is known from the state of the art. With regard to further details, reference is therefore made to this relevant state of the art.

The plate package 1 is part of a plate friction system, for example of a (wet-running) plate clutch, a brake, a holding apparatus, a differential lock, etc.

In FIG. 2, a part of a preferred embodiment variant of a friction plate 10 is shown. In the concrete case, the friction plate 10 is an inner plate 2 (FIG. 1). Its basic body 5 is shown.

The basic body 5 of this embodiment variant consists of three strips 11. The strips 11 have a geometry that deviates from the circular ring shape.

The strips 11 of this and all further embodiment variants of the friction plate 10 consist, in particular, of a metallic material, preferably of a steel. However, other metallic materials can also be used, as long as they satisfy the requirements for friction plates 10 for plate packages 1. For example, the strips can consist of aluminum, copper or their alloys. The strips 11 can also be produced from a non-metallic material, for example a polymer material, if necessary with fiber reinforcement, a composite material, etc. Also resins, if necessary with fiber reinforcement, such as polyester resins, phenolic resins, etc., for example, can be used. In this regard, the fibers can be present in woven or nonwoven form. Metal fibers, carbon fibers, glass fibers, mineral fibers, such as basalt fibers, for example, can be used as fibers, for example.

The strips 11 have a length 12 and a width 13. Both the length 12 and the width 13 conform to the respective concrete embodiment of the friction plate 10 or its concrete use. For example, the length 12 is coordinated with the diameter of the friction plate 10, i.e. the diameter of an envelope circle—viewed in the axial direction—that just encloses the strips. The width 13 in turn can conform to the number of strips 11 used in the friction plate 10. The more strips are provided, the lower the width 13 can be.

It should be pointed out that strips 11 having different lengths 12 and/or different widths 13 can be used in a friction plate 10. Preferably, however, all the strips 11 of a friction strip 10 will have the same length 12 and the same width 13.

In the axial direction 4 (FIG. 1), the strips 11 preferably have a thickness 14 (material thickness) that is selected from a range of 0.8 mm to 15 mm, in particular from a range of 1 mm to 5 mm. In this regard, once again strips 11 having different thicknesses 14 can be built into the friction plate 10, although it is preferred that all the strips 11 of a friction plate 10 have the same thickness 14. Furthermore, the more strips 11 a friction plate 10 has, the thickness 14 of the strips 11 can become smaller, so that the friction plate 10 preferably always has a total thickness in the axial direction that is selected from a range of 0.8 mm to 30 mm.

Preferably, the strips are configured to be rectangular (viewed in the axial direction 4 according to FIG. 1). However, they can also have a geometry that deviates from this. For example, the strips 11 can have an oval, elliptical, diamond-shaped form, etc. It is also possible that outer face edges 15 are configured to be at least approximately in the shape of circle segments or are configured with a rounding, as shown in FIG. 2 with a broken line for one of the outer face edges 15 of a strip 11. However, in this way, the reduction of cutting waste is reduced, so that the degree of material utilization, which lies at above 85% in most applications, is reduced.

The number of strips 11 shown in FIG. 2 is not to be understood as being restrictive. The number of strips 11 that the friction plate 10 has can, instead, be selected from a range of 1 to 15, in particular from a range of 2 to 9, preferably from a range of 2 to 6. Therefore even only one strip 11 can be used.

If more than one strip 11 is used in the friction plate 10, these are preferably rotated by a pre-definable value of an angle 16 relative to one another—viewed in a circumferential direction 17 of the friction plate 10. In this regard, the circumferential direction 17 is the circumferential direction of a circular-ring-shaped friction plate at the outer circumference. Preferably, the strips 11 are disposed rotated by the same angle value, in other words by 90° in the case of two strips 11, by 60° in the case of three strips, by 45° in the case of four strips, etc. However, it is fundamentally also possible that the strips 11 are disposed not rotated relative to one another by equally great values of the angles 16, and thereby the number of tools for the production of the strips can be reduced.

As has already been mentioned, FIG. 2 shows an embodiment variant of the friction plate 10 as an inner plate 2 (FIG. 1). In order to be able to dispose the strips 11 on a carrier 18 (FIG. 1), such as, in particular, a shaft, in torque-proof manner, these have a perforation 19 (in the axial direction 4 according to FIG. 1). The perforation 19 is provided with at least one anti-rotation element 20 on its outer circumference, which element is particularly configured as an inner gearing, as shown in FIG. 2. However, other anti-rotation elements 20, for example only individual teeth, pins, etc. can also be provided. The carrier 18 of the strips 11 or of the friction plate 10 has a complementary surface geometry on its surface for this purpose.

Preferably, if the anti-rotation element 20 is implemented as a gearing, the gearing is structured in such a manner that no relative angle is present between the strips 11.

The perforation 19 is or the perforations 19 are preferably disposed in the middle of the strip 11 or of the strips 11, in other words surrounding the (surface area) core area of the strips 11. Corners 21 at the transition from the width 13 to the length 12 of the strips thereby all lie on an imaginary circle, which just sheathes or surrounds the strips 11—viewed in the axial direction 4 (FIG. 1).

However, the friction plate 10 can also be structured as an outer plate 3 (FIG. 1). In this case, the strip 11 has or the strips 11 have the anti-rotation element 20 on a "radially" outermost face surface 22.

In the case of more than one strip 11 per friction plate 10, these can all structured to be planar in their entirety. However, in order to achieve a planar contact surface against a counter-plate for all or multiple of the strips 11 of a friction plate 10, it can be provided that one strip 11 is configured to have a plane surface, in its entirety, and at least one further strip 11 is configured with a greater thickness 14 in outer end regions 23, 24 than a center region 25 of the same strip 11.

The end regions 23, 24 are preferably both configured to have the same size; in particular, they extend from the "radially" outermost face surfaces 22 in the direction of the respective opposite "radially" outermost face surface 22 of the respective strip 11, over a range of the length 12 of the strip 11 that is selected from a range of 10% to 40%, in particular from a range of 10% to 30% of the total length 12 of the strip 11. Preferably, the end regions 23, 24 extend over the entire width 13 of the strip 11.

In this regard, the thickness 14 of these end regions 23, 24 is selected in such a manner that a surface 26 of the end regions 23, 24 of the partially thicker strips 11 can be disposed to be planar with a surface 27 of the strip 11 that is configured to be planar as a whole. This has the result that in the case of more than two strips 11 per friction plate 10, in other words three, for example, as shown in FIG. 2, the thickness 14 of the strips 11 increases in the end regions 23, 24, the farther they are apart, in the axial direction 4 (FIG. 1), from the first strip 11, which is configured to be planar in its entirety.

In contrast, the center regions 25 of all the strips 11 of a friction plate 10 can have the same thickness 14.

For the same reason, in other words so as to allow planar contact of the end regions 23, 24 of all the strips 11 of a friction plate 10, it can also be provided that although the strips 11 have the same thickness 14, i.e. the same material thickness everywhere, the end regions 23, 24 are bent around and thereby are offset, in the axial direction 4 (FIG. 1), out of the plane of the center region 25, along a bending line 28. The bending line 28 preferably extends over the entire width 13 of the strips and, in particular, runs parallel to the width expanse of the strip 11. The axial offset of the end regions 23, 24 with reference to the center region 25 of the strips 11 in turn depends on the distance of the respective strip 11, in the axial direction 4 (FIG. 1), from the strip 11 that is completely planar, as was explained with regard to the above embodiment variant of the friction plate 10.

If the friction plate 10 is a so-called coated plate having at least one friction coating 8 per end region 23, 24 (indicated with a broken line in FIG. 2 for an end region 23), the possibility exists, according to a further embodiment variant, for the same purpose as described above, that the friction coatings 8 of the individual strips 11 are configured with a different layer thickness in the axial direction 4 (FIG. 1). In this way, it is made possible that all the friction coatings of a friction plate 10 simultaneously make contact with the respective counter-plate, with formation of a friction lock. In this regard, the respective layer thickness of the friction coatings 8 in turn is based on the distance of the respective strip 11 on which they are disposed, in the axial direction 4 (FIG. 1), from the strip 11 that is completely planar.

In this connection, it should be mentioned that the respective counter-plate with which the friction plate 10, i.e. its strips 11 or friction coatings 8 can be brought into a friction lock can be configured, at least approximately, in the form of a circular ring.

In the embodiment variant of the friction plate 10 shown in FIG. 2, a planar strip 11 is combined with two further strips 11, wherein the planar strip 11 is disposed at an axial end of the friction plate 10. In order to achieve a planar contact surface of all the strips 11, which might be provided with friction coatings 8, against a counter-plate, the two strips 11 that follow the first, completely planar strip 11 are produced with different radii of curvature of the transitions between the center regions 25 and the end regions 23, 24. The end regions 23, 24 therefore have a different deflection from the plane of the center region 25 in the case of every strip.

In FIG. 3, an embodiment variant of the friction plate 10 is shown, in which a lower number of tools or a lower number of different strips 11 is required for the production of the strips 11 in comparison with the embodiment variant of the friction plate 10 according to FIG. 2, so as to achieve the planar contact surfaces of the strips 11 as described.

In this embodiment variant, the completely planar (non-bent) strip 11 is disposed in the center between the two other strips (viewed in the axial direction 4 according to FIG. 1). As a result, the two other strips 11 can be configured in the same manner, i.e. with an equally great deflection of the end regions 23, 24 out of the plane of the center region 25. The only thing necessary is that one of the "bent" strips 11 is built into the friction plate 10 in inverted manner.

It should be mentioned that the number of strips 11 of the friction plate 10 shown in FIG. 3 should not be understood as being restrictive. Even in the case of more than three strips 11 per friction plate 10, this principle can be applied, in that the completely planar strip 11 is built in in the center between the remaining strips 11. If, in this regard, the number of strips 11 per friction plate 10 happens to be even, then a single strip 11 can be used that has a greater (the greatest) deflection of the end regions 23, 24 out of the plane of the center region 25. In the case of an uneven number of strips 11 per friction plate 10, this is not necessary.

The bent regions of the strips 11 can also be used for the purpose that larger counter-plates, in terms of surface area (having a smaller inside diameter) can be used. Due to the bending radii, contact with the counter-plate can be produced in the case of friction coatings 8 having a greater friction coating thickness. Therefore the friction performance can be increased in this way.

For the sake of completeness, it should be mentioned that the end regions 23, 24 of all the strips 11 of a friction plate 10 can be configured to have the same size. However, it is also possible that at least one of the strips 11 of a friction plate 10 has at least one end region 23, 24 that has a different size from the remaining end regions 23, 24 of the strips 11. In this regard, the size relates to the expanse, in terms of area, of the end regions 23, 24, viewed in the axial direction.

With regard to the friction coatings 8, it should be mentioned that these—viewed in a top view—can have a rectangular geometry, as indicated in FIG. 2. However, it can also be advantageous to use friction coatings 8 having a geometry that deviates from the rectangle shape (or square shape). For example, FIG. 4 shows a top view of a friction coating 8 having a curved surface 29, which is configured, in particular, to be concave (in other words arched inward). In this way, any wobbling of the strips 11 during friction engagement with the counter-plate that might be caused by non-uniform wear of the friction coatings 8 can be countered.

In this regard, the curved surface 29 faces the perforation 19 (FIG. 2), so that the curved surfaces 29 of the friction coatings 8 of a friction plate 10 lie approximately on a circle or form segments of a common circle.

The cross-sectional shape shown in FIG. 4 is meant only as an example. Other shapes of the friction coatings 8 are also possible for this purpose.

The strips 11 of a friction plate 10 can be connected with one another, for example by means of welding, soldering, gluing, shape fit, rivets, screws, etc. In the preferred embodiment variant of the friction plate 10, however, the strips 11 are not connected with one another, in other words are loosely disposed on the carrier 18. In this regard, placement preferably takes place in such a manner that two or three strips 11, in each instance, lie directly against one another. Furthermore, their placement preferably takes place rotated about the angle 16 described above, relative to one another. Further rotation of the strips 11 in the circumferential direction 17 during operation of the friction plate 10 is prevented by the at least one anti-rotation element 20 per strip 11.

However, it is also possible that the strips 11 of a friction plate 10 are disposed at a distance from one another in the axial direction, by way of a spacer element, for example a washer. In this regard, the radial expanse of this spacer element is maximally as great as half the expanse of the center region 25 of the strip 11 in the direction of the length 12. In this way, better oiling of the strips 11 and better heat dissipation can be achieved. It is also possible to structure the spacer elements in elastic manner or to produce them from a material that is more elastic in comparison with the material of the strips 11, for example from an elastomer or a polymer plastic. With this embodiment variant, an improvement in the vibration properties and noise properties of the friction plate 10 can be achieved by means of absorption of vibrations that occur. In this way, the aforementioned wobbling of the strips 11 can also be prevented or reduced by means of improved adaptation to the counterplate.

The strips 11 can be produced by means of cutting them out, for example by means of laser, punching, etc., from a plate or a strip of a material of which the strips 11 are supposed to consist. If necessary, the strips 11 can be roughly finished and/or precision-finished afterward, for example by means of honing, planing, grinding, etc. Such sheet-metal processing methods are known as such from the state of the art, so that this does not need to be discussed in any greater detail.

If necessary, the strips 11 can also be hardened, at least in the region of the perforation 19 (in specific regions or around the entire circumference around the perforation 19) and/or in the end regions 23, 24. Complete hardening of the strips 11 is also possible. Methods for hardening of metal components are also known from the state of the art.

In addition to hardening or alternatively, the strips 11 can be coated. For example, a CVD coating or PVD coating can be provided. In particular, a DLC (diamond-like carbon) coating can be used.

The strips can be given greater strength in comparison with the basic material, both by means of hardening and by means of coating. In this way, it is possible to use strips 11 that are thinner and/or consist of a softer material (and are therefore less expensive) in the friction plate 10. Softer materials are, for example, low-alloy steels, etc.

The exemplary embodiments show and describe possible embodiment variants, wherein it is noted at this point that various combinations of the individual embodiment variants with one another are also possible.

For the sake of good order, it should be pointed out, in conclusion, that for a better understanding of the structure of the friction plate 10, it was not necessarily shown to scale.

REFERENCE SYMBOL LISTING

1 plate package
2 inner plate
3 outer plate
4 axial direction
5 basic body
6 surface
7 surface
8 friction coating
9 basic body
10 friction plate
11 strip
12 length
13 width
14 thickness
15 face edge
16 angle
17 circumferential direction
18 carrier
19 perforation
20 anti-rotation element
21 corner
22 face surface
23 end region
24 end region
25 center region
26 surface
27 surface
28 bending line
29 surface

The invention claimed is:

1. A friction module comprising multiple friction plates, which are disposed on a carrier, one behind the other in an axial direction, wherein at least one of the friction plates is configured as a friction plate having a basic body, which is formed from at least two strips, deviating from a circular-ring shape, which strips are disposed rotated relative to one another by a pre-definable angle;
   wherein the strips are formed with outer end regions and a center region that lies between them;
   wherein the multiple strips are indirectly connected with each other;
   wherein each of the strips has a breakthrough defining an inner circumference of the strip and in which the carrier is arranged;
   wherein each of the strips has a radially outermost face;
   wherein each of the strips has at least one anti-rotation element on the inner circumference or the radially outermost face; and
   wherein the strips are loosely arranged on the carrier and indirectly connected with each other by the carrier only via the at least one anti-rotation element of each strip and are prevented from relative rotation to one another in the circumferential direction during operation by the at least one anti-rotation element.

2. The friction module according to claim 1, wherein the outer end regions of at least one strip are structured with a greater thickness than the center region of the same strip.

3. The friction module according to claim 2, wherein at least one friction coating is disposed in the outer end regions of the at least one strip.

4. The friction module according to claim 3, wherein the friction coatings of the at least two strips have a different layer thickness.

5. The friction module according to claim 1, wherein the end regions of at least individual strips are bent around or are configured to be offset out of the plane of the center region.

* * * * *